June 4, 1963
B. B. OHNSTAD
3,092,056
APPARATUS FOR FORMING WELDED HELICAL
SEAM TUBING FROM METAL STRIP
Filed Jan. 30, 1959
6 Sheets-Sheet 1
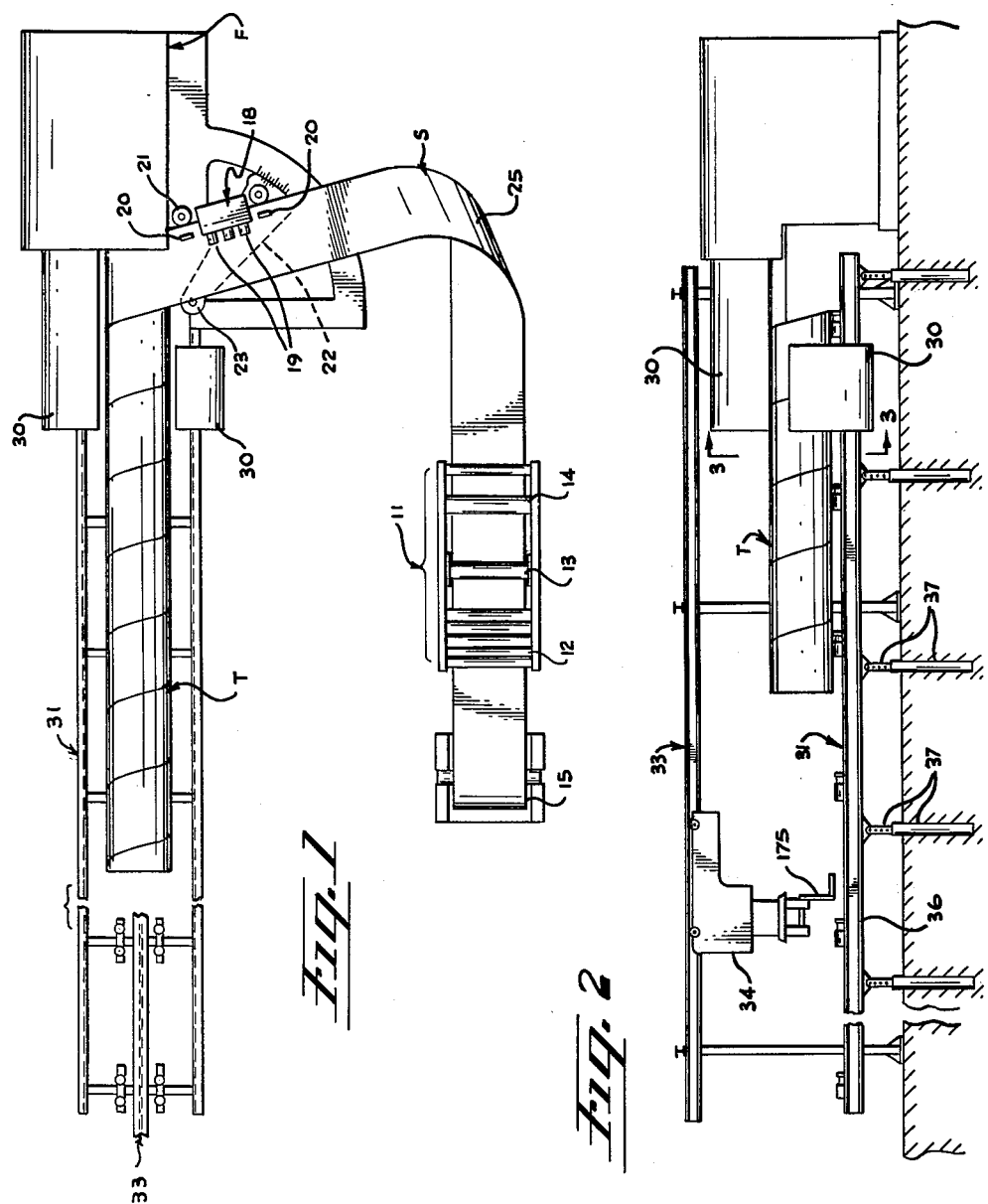
INVENTOR.
BURL B. OHNSTAD
BY
Mason & Graham
ATTORNEYS June 4, 1963

B. B. OHNSTAD 3,092,056

APPARATUS FOR FORMING WELDED HELICAL
SEAM TUBING FROM METAL STRIP

Filed Jan. 30, 1959

INVENTOR.
BURL B. OHNSTAD
BY
Mason & Graham
ATTORNEYS

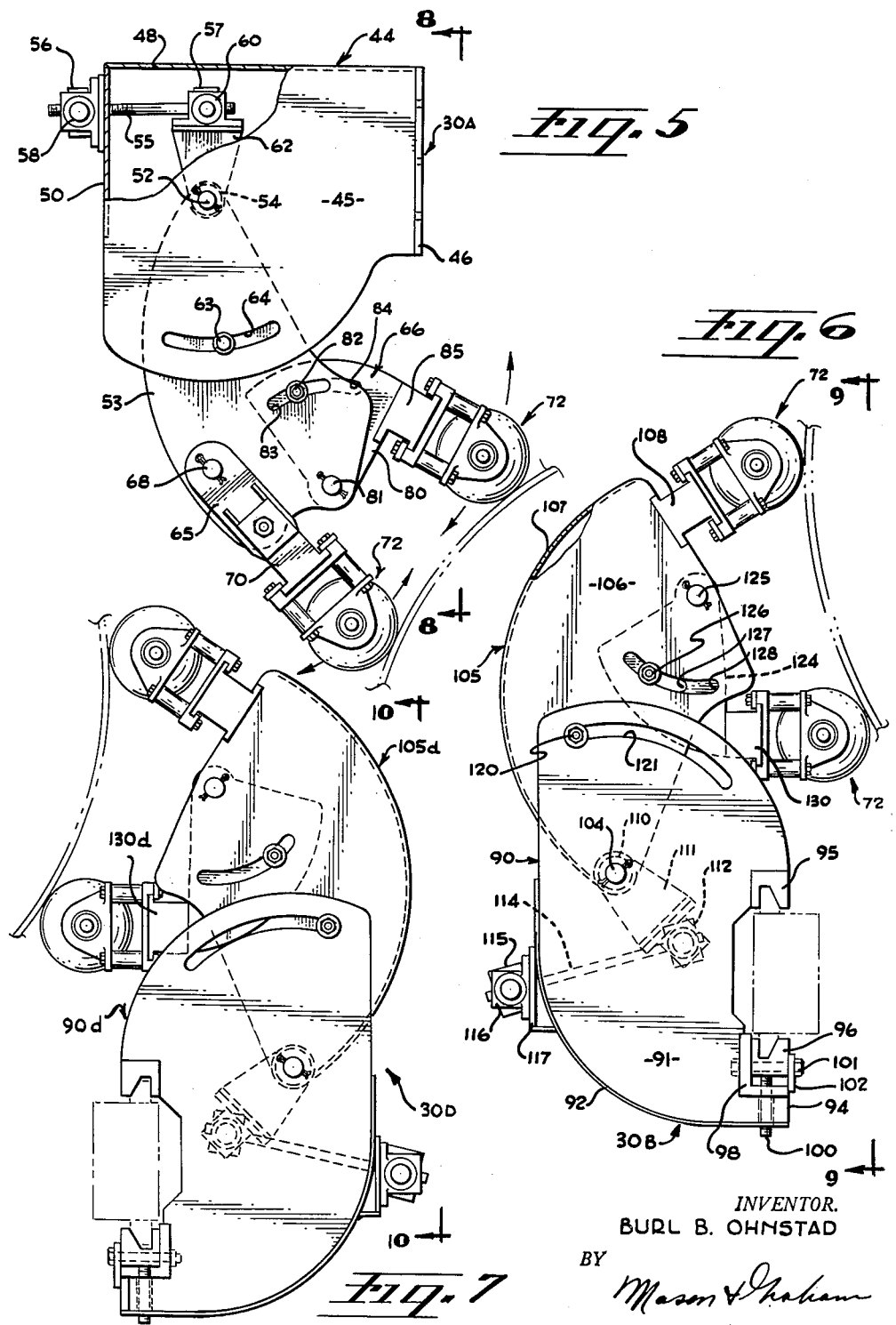

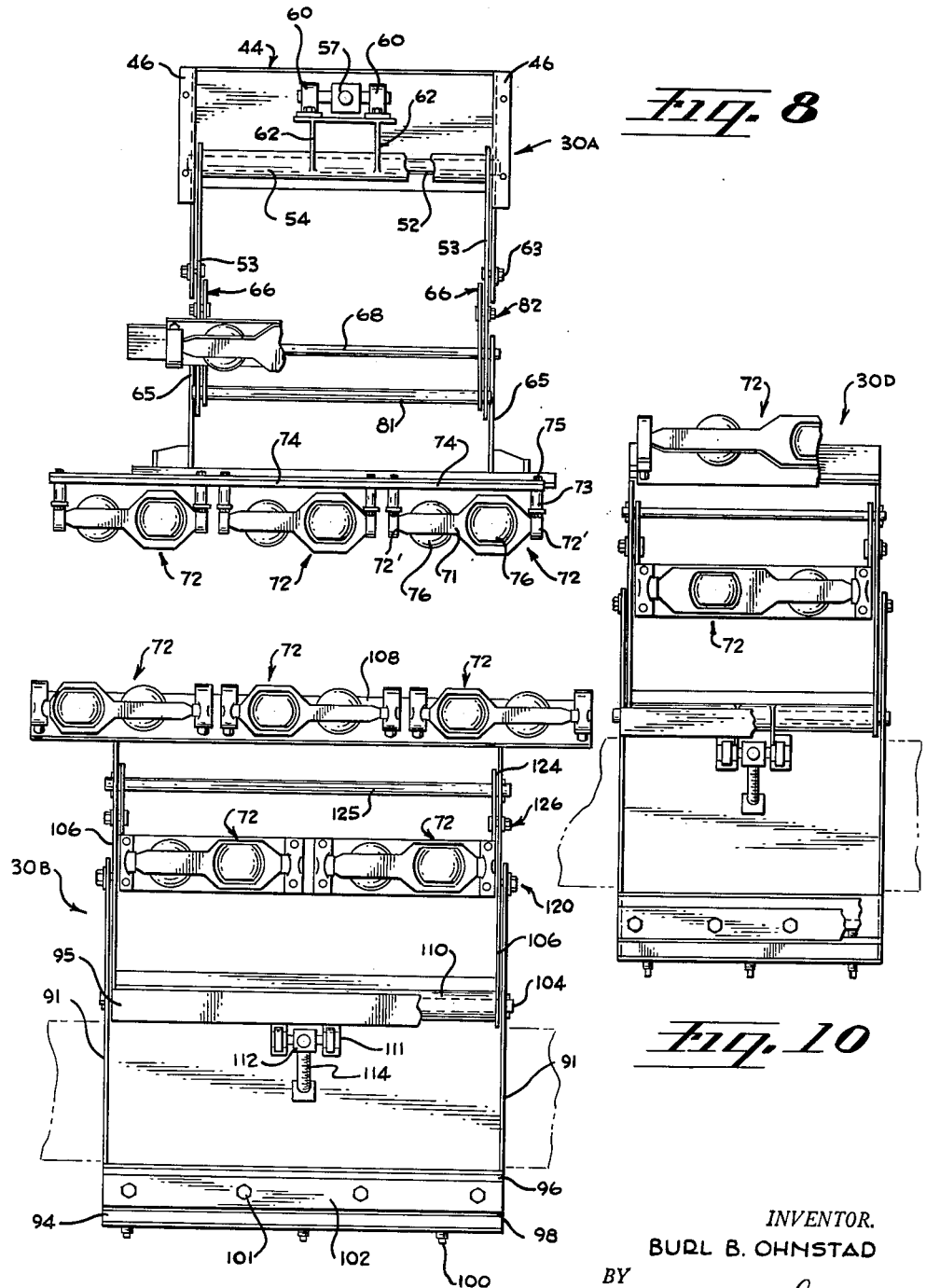

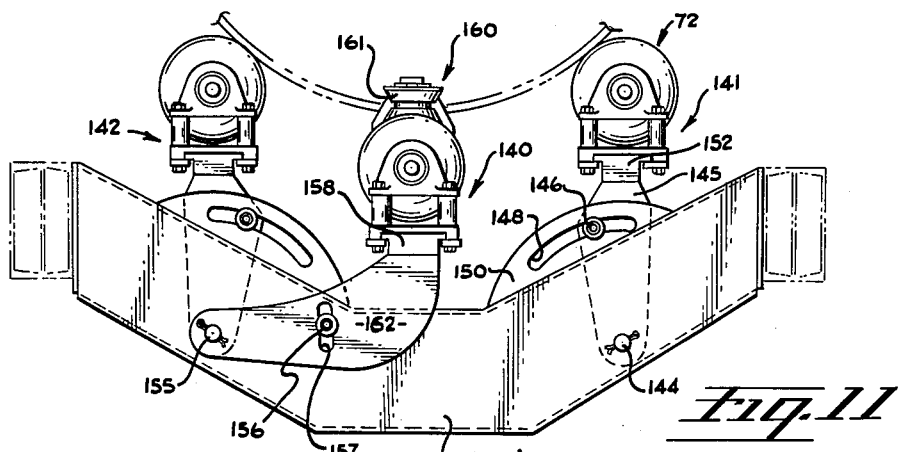
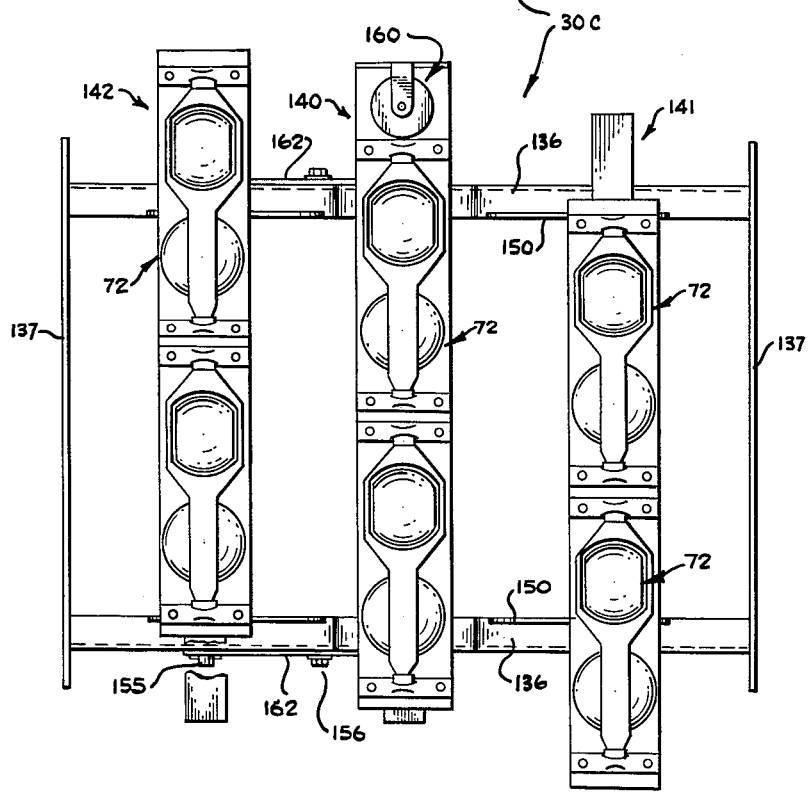

INVENTOR.
BURL B. OHNSTAD
BY
Mason & Graham
ATTORNEYS

United States Patent Office 3,092,056
Patented June 4, 1963

3,092,056
APPARATUS FOR FORMING WELDED HELICAL SEAM TUBING FROM METAL STRIP
Burl B. Ohnstad, South Gate, Calif., assignor to American Pipe and Construction Co., Los Angeles, Calif., a corporation of Delaware
Filed Jan. 30, 1959, Ser. No. 790,210
5 Claims. (Cl. 113—35)

This invention has to do generally with the fabrication of metal tubing wherein metal strip is wound helically into a cylindrical tube and the seams joined by welding.

In making cylindrical metal tubing of the type indicated, especially steel tubing, it is common to provide a supply roll of the strip and various strip-conditioning elements, such as strip-straightening or leveling means, strip-trimming means as well as strip-advancing means, all in alignment with the final feed means which forces the strip into the tube-forming machine at the correct helix angle. This has caused considerable difficulty in the manufacturing process because of the necessity for accurately controlling the helix angle which entails angularly adjusting all of said aforementioned means and elements for any change of heilx angle. Furthermore there is the danger of binding due to irregularities in the strip itself where the strip is forced forward by the conditioning units to the final feed or guide means where minor adjustments must be made for such irregularities. It therefore is an object of the invention to provide a novel apparatus for overcoming the difficulties and disadvantages of the conventional method and apparatus above outlined.

More particularly it is an object to provide an arrangement of apparatus wherein the forming unit and its associated feed unit is isolated from the supply and conditioning units to enable adjustment of the feed unit of the forming means independently of the supply and conditioning units and thereby insure the feeding of the metal strip accurately at the required helix angle without interference from the conditioning and supply units.

Another object is to provide a more compact arrangement of the strip supply and strip conditioning or preparation means and the tube fabricating unit and immediate feed means therefor.

Other disadvantages of conventional tube-forming machines of the type indicated are: that the tube guide and forming means which supports the initial winding or turn of the strip as it is forced into helical form imposes considerable frictional resistance to movement of the strip; that they are inflexible and normally cannot be adjusted to accommodate various sizes or diameters of tubing to be formed except by the replacement of elements; and, that they are difficult to align and properly adjust accurately as required. Therefore, a further object is to provide a novel means to guide, support and assist in forming the advancing metal strip into helical form which offers only minimum frictional resistance to the strip.

Another object is to provide a novel forming and support means for the purpose described embodying a multiplicity of units which are readily adjustable for the formation of any diameter size of tubing within a large range, as well as novel means which can be readily accurately minutely adjusted to the requirements of any given size tubing being formed. Further in this connection it is an object to provide a readily adjustable means of the type indicated wherein certain supporting elements or groups of elements can be retracted to an out of the way position for the making of smaller diameter tubing.

Still another object is to provide a novel combination of elements including an off-bearing table or support upon which the fabricated tubing is supported as it is advanced axially, and a forming means and a guide means all of which can be readily set up or aligned with reference to a common reference matter.

These and other objects will be apparent from the drawings and the following description. Referring to the drawings:

FIG. 1 is a diagrammatic view illustrating the arrangement of several components of the apparatus;

FIG. 2 is a side elevational view partly diagrammatic illustrating various components of the invention;

FIGS. 5, 6 and 7 are end enlarged elevational views of three of the guide assemblies shown in FIG. 3;

Figure 3:
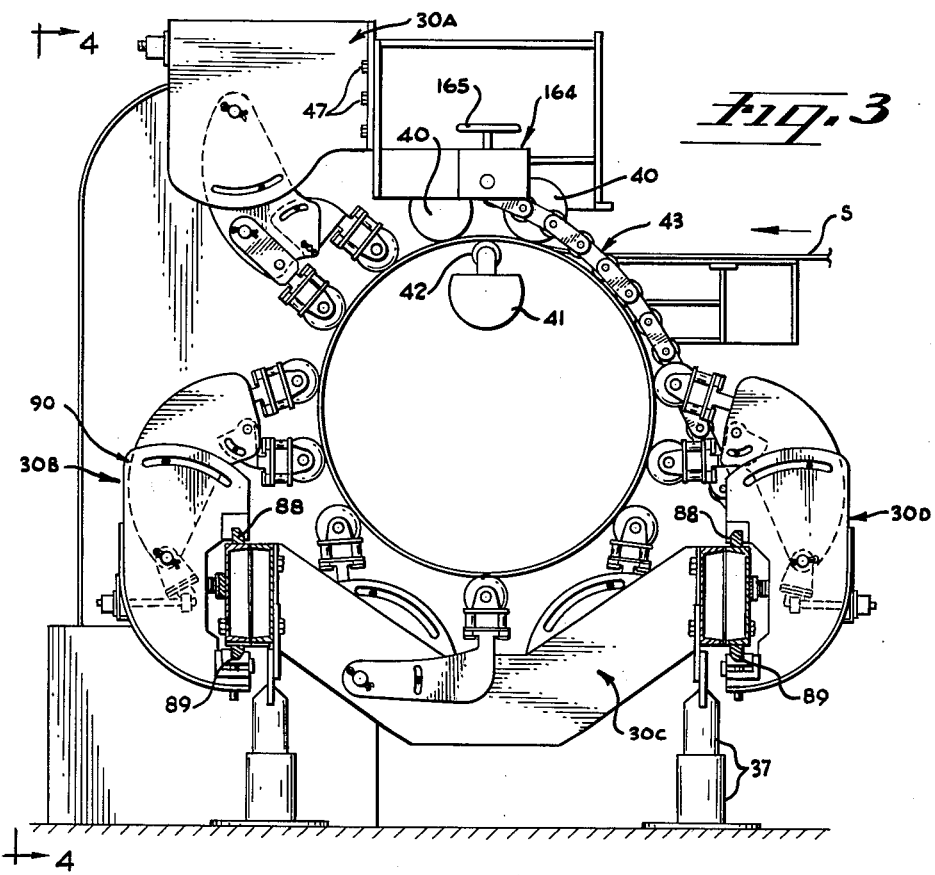
FIG. 3 is a sectional elevational view of the strip guide means of the invention, taken on lines 3—3 of FIGS. 2 and 4.
Figure 4:
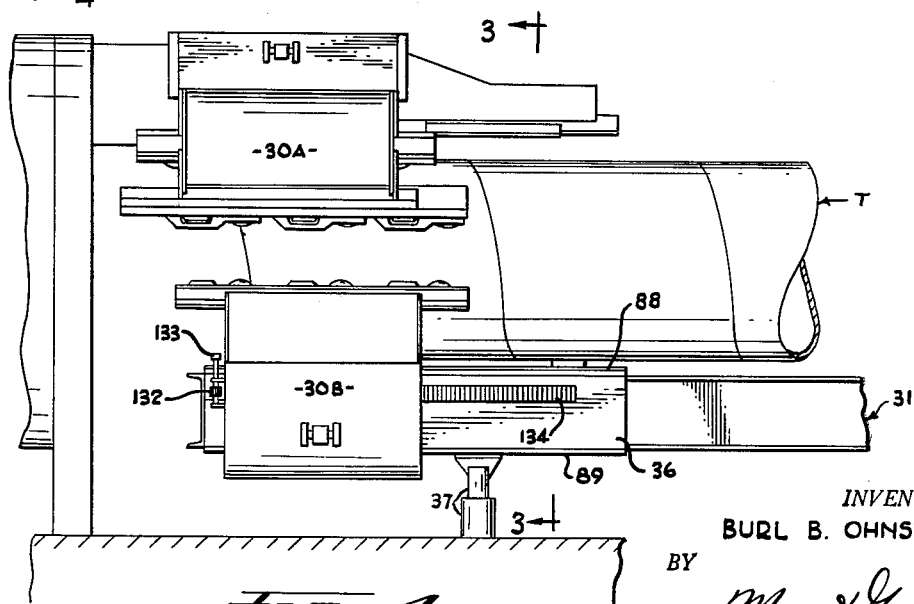
FIG. 4 is a side elevational view of the strip guide means illustrated in FIG. 3, but on a smaller scale, taken on line 4—4 of FIG. 3.
Figure 13:
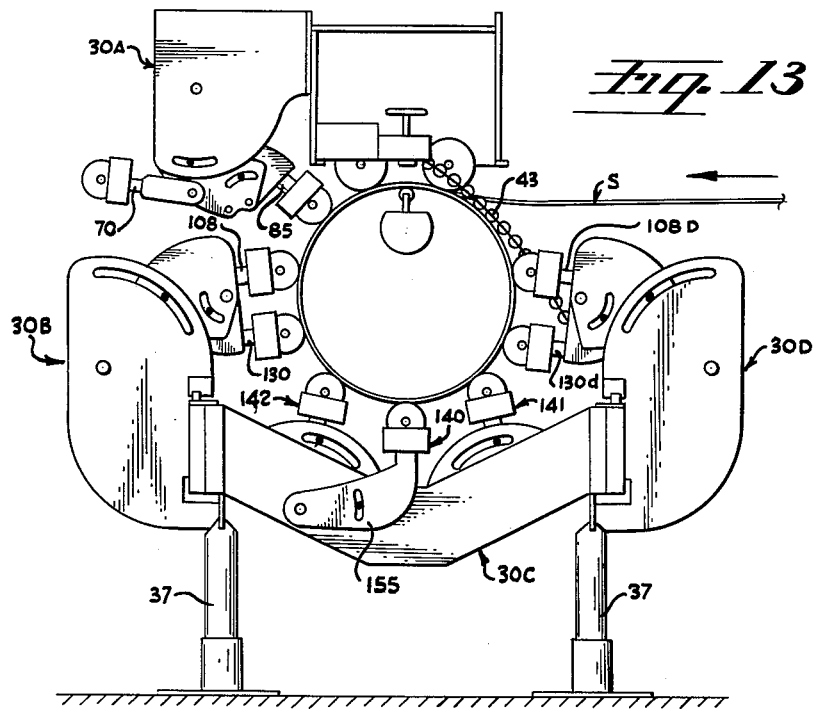
Figure 14:
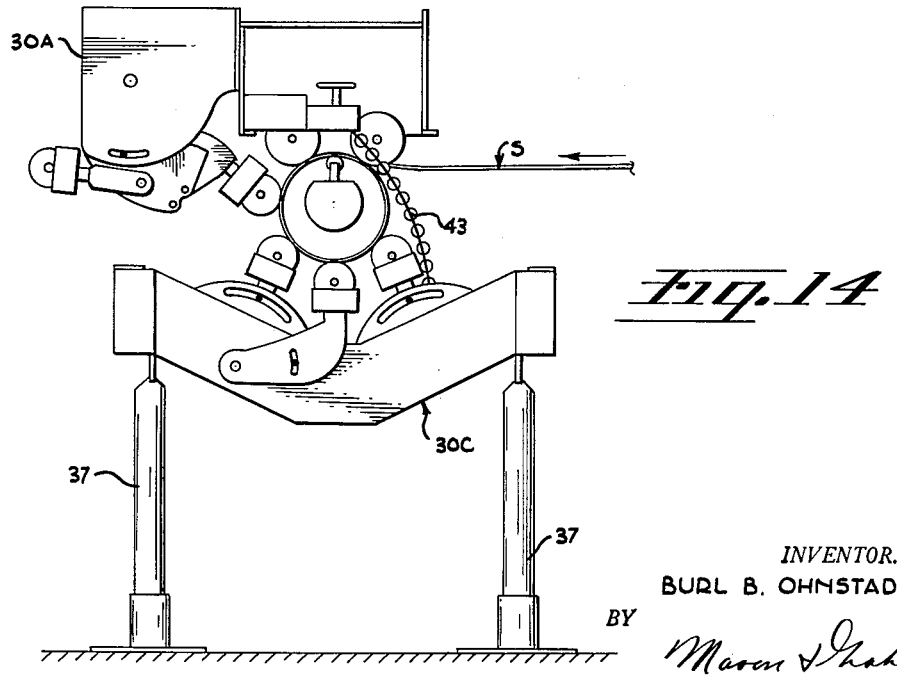

FIGS. 8, 9 and 10 are fragmentary sectional elevational views on lines 8—8, 9—9 and 10—10 of FIGS. 5, 6 and 7 respectively;

FIG. 11 is an enlarged elevational view of the lower set of guide elements shown in FIG. 3;

FIG. 12 is a plan view of the elements shown in FIG. 11;

FIG. 13 is a diagrammatic view illustrating one of the adjusted positions of the device; and FIG. 14 is another diagrammatic view illustrating another adjusted position of the device.

Referring first to FIG. 1, which is a diagrammatic view illustrating the manner in which metal strip, designated S, is prepared and fed into the forming machine F to form tubing T shown issuing from the machine, one of the features of the invention is the isolation of the strip supply and conditioning means from the means which feeds the strip to the forming machine at the correct helix angle. Thus I show strip conditioning means designated 11 which may comprise such elements as leveling or straightening rollers 12, trimming or shear rollers 13, and motor-driven drive rollers 14, the latter serving to pull the strip from a supply roll 15 through whatever elements may be included in the strip conditioning means 11 and cause the strip to move on beyond such means.

Numeral 18 generally designates a strip feed means which may include a plurality of drive rollers 19 both above and below the strip as well as upper guide rollers 20 and edge or marginal guide rollers 21. The means 18 is mounted for pivotal adjustable movement upon a frame 22 which is pivoted at 3 so that it may be adjusted to feed the strip into the machine at the correct helix angle.

With the above described arrangement the strip has a slack turn portion or partial loop 25 in the region between the strip conditioning means and the strip feed means, the strip being inverted in passing through the turn or partial loop. Consequently any irregularities in the advancing of the strip by the strip conditioning means will have no effect upon the strip feed means, and thus both major and minor adjustments of the strip feed means 18 can be made without regard to the strip conditioning means. It will be apparent that the arrangement of the apparatus and the method of handling the strip has many advantages over conventional apparatus where the strip supply and conditioning means are mounted in alignment with the strip feed means and all elements must be swung as a unit to effect adjustment of the helix angle. Also there is no binding such as often results from driving of the strip directly into the feed means from the conditioning means.

Referring now to FIG. 2 I show tubing T issuing from the forming machine F and guide means 30 for the strip to be described in detail later, and supported upon an off-bearing table 31. Associated with these elements is an overhead reference member in the form of a rigid monorail 33 upon which a car 34 may travel and as will later be apparent act as a guide for aligning the various components. The off-bearing table is generally the same as that shown in my co-pending application for patent entitled Apparatus for Supporting Fabricated Tubing and Severing Predetermined Lengths Thereof as the Same Advances, Serial No. 774,029 filed November 14, 1958, now abandoned. The table includes a frame 36 supported upon vertically adjustable legs 37. The frame extends beneath a portion of the forming machine F and serves to carry certain elements of the strip guide means 30. The latter comprises four major assembly units designated 30A, 30B, 30C, and 30D, respectively (see FIG. 3). The first of these is carried upon the head of the forming machine while the remainder are supported upon the table.

The forming machine itself is shown provided with two conventional forming rolls 40 and it will be understood that any conventional drive means may be used for rotating these elements. Centrally of and below the rolls is a stationary mandrel 41 which carries a plurality of rollers 42 and it will be understood by those in the art that, as shown in FIG. 3, the strip S is fed beneath the rolls 40 and over the mandrel 41 to bend the strip initially and that subsequently the strip is guided and formed to the correct diameter by the guide units 30A, 30B, and 30D, and a chain 43. It will be understood that seams of the tubing are formed by welding together adjacent edges of the helical convolutions of the strip, although the welding means is not shown in the drawings.

Unit 30A (FIGS. 5 and 8) comprises a main body 44 which includes end members 45 which are flanged at 46 and secured by means of bolts 47 passing therethrough into the frame of the forming machine F. The end members are connected by a top plate 48 and a side plate 50. Extending between the end members is a shaft 52 upon which two main arms 53 are carried. The arms are fixed to a rigid tube 54. The latter is pivotally adjustable on shaft 52 by means of a screw 55 received in nuts 56 and 57. Nut 56 is journaled in bearings 60 carried on a pair of actuator arms 62 rigidly mounted on tube 54. Nut and bolt assemblies 63 which pass through arcuate slots 64 in members 45 are used to secure the parts in adjusted position.

Each main arm 53 carries a pair of auxiliary arms 65 and also a pair of secondary arms 66. The former are carried upon a shaft 68 supported between the main arms. The auxiliary arms support bar 70 of T-shape in cross section which is welded or otherwise secured to the arms. Mounted for adjustable positioning along the bar 70 are three roller units 72 of a universal type such as disclosed in U.S. Patent No. 2,858,000. Each unit comprises a body 71 journaled at its ends in bearings 72' which are supported upon spacer sleeves 73 above a base 74 by means of the bolt and nut elements 75. In each body 71 are two rollers 76 which are mounted upon axes which are normal to each other and normal to the axis of rotation of the body.

The secondary arm structure 66 includes a pair of sector plates 80 pivotally mounted upon a shaft 81. Each plate carries a bolt and nut assembly 82 which passes through arcuate slots 83 and 84 in the main arm and secondary arm, respectively, for the purpose of securing the secondary arm in adjusted position. The secondary arms support a bar 85 and adjustably mounted on this are three roller units 72 of the type previously described.

The units 30B and 30D are each mounted upon the table 31 upon tracks which extend longitudinally of the table and include the elements 88 and 89. Referring to FIGS. 3, 6 and 9, unit 30B comprises a main frame unit 90 which includes end plates 91, a curved side plate 92 which extends therebetween, and a narrow inner element 94. These elements are welded or otherwise secured together.

The frame unit 90 is provided with a track engaging member 95 adapted to rest upon the upper rail 88 of the track on the frame 36 of the table. Beneath member 95 is a track clamp 96 which is carried for vertical adjustment in an angle or L-shaped member 98 secured to frame 90. Adjustment screw 100 and bolt assemblies 101 in conjunction with a locking bar 102 serve to adjust and secure the clamp 96.

Mounted for pivotal movement about a shaft 104 which extends between the end plates 91 is a main arm bracket 105 which includes the two end plate arms 106 connected by a sidewall 107 and supporting a mounting bar 108 of generally I-shape in cross section. A plurality of universal type roller units 72 of the type previously described are mounted upon the bar 108 in the same manner as such units are mounted upon bars 70 and 85 of the unit 30A.

The main arm bracket 105 includes a tube 110 extending between and welded to plates 106. The tube is provided with a pair of actuator arms 111 which serve to journal a nut 112. The latter receives an adjustment screw 114 which is mounted in a second nut 115 journalled at 116 upon the mounting 117. By rotating the screw 114 the structure 105 may be pivoted to the correct angle and subsequently secured in adjusted position by nut and bolt assemblies 120 carried in the plates 106 and received in arcuate slots 121 in the end plates 91.

The main arm structure 105 also supports a pair of secondary arms 124 upon a shaft 125 extending between end plates 106. The secondary arms are each provided with a retaining bolt assembly 126 which passes through arcuate slots 127 and 128 in members 106 and 124 respectively. The secondary arms rigidly support a mounting bar 130 which carries a pair of the universal roller assemblies 72 in the manner previously described.

To facilitate adjusted positioning of unit 30B the frame structure 90 is provided with a pinion 132 on a shaft 133, the pinion engaging a rack 134 on frame 36. A wrench or suitable tool can be applied to the shaft to turn the pinion.

Unit 30C includes a frame comprising a pair of laterally spaced, V-shaped frame elements 136 extending between side plates 137, the latter being rigidly secured to frame 36 of the table. Mounted on each of the cross members are three roller assemblies designated 140, 141 and 142. The assembly 141, is pivotally mounted upon a shaft 144 and includes a pair of arms 145 which are adjustably secured at the proper position by means of nut and bolt assemblies 146 carried thereby which pass through arcuate slots 148 provided in sections 150 of the frame elements. The two arms 145 support a mounting bar 152 which in turn supports a pair of universal conveyor roller units 72 as previously described.

The other assemblies 140 and 142 are supported upon a shaft 155, assembly 142 being the same as assembly 141. Assembly 140 comprises a pair of arms 162 each of which can be secured in adjusted position by bolt and nut means 156 in member 136 received in a slot 157 in the arm. The arms extend laterally of the shaft 155 and upwardly at their ends to rigidly support a mounting bar 158 upon which a pair of roller units 72 is mounted.

The mounting bar 158 also carries rollers 160 providing a grooved roller surface 161 to receive the edge of the strip at the rear portion of the turn made by the strip.

Unit 30D is of the same basic construction as unit 30B although substantially narrower, as seen from a comparison of FIGS. 9 and 10 of the drawing, and is mounted upon the table frame in the same manner as unit 30B in facing relation thereto. In view of the similarity of construction the parts of unit D will not be described in detail and the parts which correspond to those of unit 30B bear corresponding reference numerals plus letter "d."

As a further means of guiding the strip in its first convolution or turn I also provide the aforementioned chain 43, the lower end of which is attached at a suitable point to the structure at unit 30D. The upper end of the chain is secured to a winch or the like 164 which can be operated by a hand wheel 165 to tighten the chain as required.

With reference to the structure thus far described, each of the groups of rollers carried on the bars 70, 85, 108, 130, 108d, 130d, 145 and 158 may be termed a "set" of rollers for the purpose of description.

It will be apparent that the guide means including the units 30A, 30B, 30C and 30D provides an extremely flexible structure which offers only minimum friction to the advancing metal strip. Also, it should be apparent that each of the sets of rollers which engage the strip can be individually adjusted and that in the case of the units 30A, 30B, and 30D that two sets of guide rollers can be adjusted as a unit. In FIG. 3 the guide means is shown adjusted for making relatively large diameter tubing requiring all of the various sets of guide rollers. For making smaller diameter tubing one or more of the sets of rollers may be swung aside, and, by way of example, in FIG. 13 I show the set of rollers carried on mounting bar 70 swung to an out-of-the-way position leaving only eight sets of rollers in engagement with the strip which is being formed into tubing. From this figure it will also be apparent that the table has been raised in order to elevate units 30B, 30C and 30D, and that the main brackets 105 and 105d have been swung inwardly and appropriate adjustments made to raise the rollers carried by the mounting bars 130 and 130d.

In making a size of tubing having a diameter smaller than that shown in FIG. 13 but larger than that shown in FIG. 14, the rollers carried upon the mounting bars 130 and 130d may be swung backward out of the way leaving only six sets of rollers in operable position for guiding the strip. For making even smaller diameter tubing, units 30B and 30D may be removed from the table leaving only unit 30C and the uppermost rollers of unit 30A defining the path of the strip.

As previously indicated one of the features of the invention is the provision of means whereby when the apparatus is initially set up for the manufacture of a given size tubing, all of the adjustable elements can be gauged with reference to a common member namely the monorail 33 shown in FIG. 2 which is disposed horizontally directly above the desired axis of the formed tubing. To assist in utilizing the rail 33 as a reference member a car 34 movable therealong may be fitted with a gauge member 175 which can be used for insuring that all of the various roller assemblies are properly adjusted with reference to the desired axis of the tubing to be formed.

Although I have illustrated and described a preferred form of my invention, I contemplate that various changes and modifications can be made therein without departing from the invention, the scope of which is indicated by the following claims:

I claim:

1. In apparatus for fabricating helical seam cylindrical tubing from metal strip by forming the strip into a helix and welding the seams including mandrel means for initially bending the strip, guide means engaged by the strip after being initially bent, comprising a support, a frame unit mounted on said support, a main arm structure pivotally adjustable on said frame unit about an axis parallel to the axis of the tubing being formed, secondary arm structures independently pivotally adjustable on said main arm structure about an axis parallel to the tubing being formed, and spaced from the pivotal axis of the main arm structure and rollers carried by said secondary arm structures remote from their pivotal axes.

2. The structure set forth in claim 1 in which said frame unit is mounted on said support for adjusted positioning on said support in a direction axially of said tubing being formed.

3. The structure set forth in claim 1 in which said support comprises a vertically adjustable framework.

4. The structure set forth in claim 1 in which said main arm structure is provided with a mounting bar extending parallel to the axis of the tubing being formed and in which said mounting bar carries rollers.

5. The structure as set forth in claim 1 in which said main arm structure is provided with an auxiliary arm structure mounted on said main arm structure at a point materially spaced from said axis of said secondary arm structure, and in which said auxiliary arm structure is also provided with rollers.

References Cited in the file of this patent

UNITED STATES PATENTS

| 778,472 | Beyer | Dec. 27, 1904 |
| 1,288,134 | Naylor | Dec. 17, 1918 |
| 1,288,576 | Hart | Dec. 24, 1918 |
| 1,659,792 | Thorsby | Feb. 21, 1928 |
| 1,884,658 | Gladkov et al. | Oct. 25, 1932 |
| 1,915,029 | Naylor | June 20, 1933 |
| 2,554,555 | Bissell et al. | May 29, 1951 |
| 2,635,572 | Hesterman | Apr. 21, 1953 |
| 2,693,779 | Padgett | Nov. 9, 1954 |
| 2,729,180 | Freeze | Jan. 3, 1956 |

FOREIGN PATENTS

| 264,620 | Great Britain | Jan. 27, 1927 |
| 554,520 | Great Britain | July 7, 1943 |